United States Patent
Kim et al.

(10) Patent No.: US 8,953,542 B2
(45) Date of Patent: Feb. 10, 2015

(54) METHOD AND APPARATUS FOR RECEIVING MULTI-BAND INFORMATION IN A WLAN SYSTEM

(75) Inventors: Eunsun Kim, Gyeonggi-do (KR); Yongho Seok, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 234 days.

(21) Appl. No.: 13/635,790

(22) PCT Filed: Mar. 18, 2011

(86) PCT No.: PCT/KR2011/001883
§ 371 (c)(1),
(2), (4) Date: Nov. 9, 2012

(87) PCT Pub. No.: WO2011/115448
PCT Pub. Date: Sep. 22, 2011

(65) Prior Publication Data
US 2013/0114586 A1    May 9, 2013

Related U.S. Application Data

(60) Provisional application No. 61/315,391, filed on Mar. 18, 2010, provisional application No. 61/315,397, filed on Mar. 19, 2010, provisional application No. 61/321,508, filed on Apr. 7, 2010, provisional application No. 61/330,903, filed on May 4, 2010, provisional application No. 61/433,508, filed on Jan. 17, 2011.

(51) Int. Cl.
*H04W 4/00* (2009.01)
*H04W 28/16* (2009.01)
*H04L 5/00* (2006.01)

(Continued)

(52) U.S. Cl.
CPC ............. *H04W 28/16* (2013.01); *H04L 5/0091* (2013.01); *H04W 16/14* (2013.01); *H04W 52/367* (2013.01); *H04W 72/04* (2013.01); *H04W 52/281* (2013.01)
USPC .......................................... 370/329; 370/338

(58) Field of Classification Search
None
See application file for complete search history.

(56) References Cited

U.S. PATENT DOCUMENTS 7,277,724 B2 * 10/2007 Jones et al. ................. 455/553.1
8,483,155 B1 * 7/2013 Banerjea et al. .............. 370/329

(Continued)

OTHER PUBLICATIONS

Search Report and Written Opinion issued in International Application No. PCT/KR2011/001883 dated Nov. 23, 2011.

(Continued)

*Primary Examiner* — Eunsook Choi
(74) *Attorney, Agent, or Firm* — Morgan, Lewis & Bockius LLP

(57) ABSTRACT

The present invention relates to a method and apparatus for receiving multi-band information in a WLAN system. The method for receiving multi-band information by a first station (STA), operating as an unlicensed device, within an available channel which is not used by a licensed device in a white space band of a WLAN system according to one aspect of the present invention comprises: allowing the first station to receive, from a second station, information about a first band and a second band through the first band that is currently being communicated with the first and second stations; and allowing the first station to communication with the second station through the second band, wherein the first station and the second station are multi-band stations that support the first band and the second band.

14 Claims, 13 Drawing Sheets

(51) Int. Cl.
  *H04W 16/14*  (2009.01)
  *H04W 52/36*  (2009.01)
  *H04H 20/67*  (2008.01)
  *H04W 72/04*  (2009.01)
  *H04W 52/28*  (2009.01)

(56) References Cited

U.S. PATENT DOCUMENTS

| | | | |
|---|---|---|---|
| 2004/0137905 A1* | 7/2004 | Jeong et al. | 455/450 |
| 2006/0281404 A1* | 12/2006 | Lee et al. | 455/11.1 |
| 2008/0014934 A1* | 1/2008 | Balasubramanian et al. | 455/434 |
| 2010/0048234 A1 | 2/2010 | Singh | |
| 2011/0110349 A1* | 5/2011 | Grandhi | 370/338 |
| 2011/0116488 A1* | 5/2011 | Grandhi | 370/338 |
| 2012/0026941 A1* | 2/2012 | Ahmad et al. | 370/328 |
| 2012/0129467 A1* | 5/2012 | Wang et al. | 455/67.14 |

OTHER PUBLICATIONS

LG Electronics, "Amendment Proposal for TV White Spaces Operation," IEEE 802.11, TGaf, IEEE 802.11-10/0263r1, Mar. 18, 2010.

NICT, "Enabling Procedure of Communication in TVWS under FCC rules," IEEE 802.11, TGaf, IEEE 802.11-10/0261/1 dated Feb. 28, 2009.

ECMA International, "MAC and PHY for Operation in TV White Space," Final Draft Standard ECMA-XXX, 1st Edition, Ecma/TC48/2009/061 dated Oct. 2009.

* cited by examiner

FIG. 4

| Order | Information | Notes |
|---|---|---|
| 1 | Timestamp | |
| 2 | Beacon interval | |
| 3 | Capability | |
| 4 | SSID | |
| 5 | Supported rates | |
| 6 | FH Parameter Set | The FH Parameter Set information element is present within Probe Response frames generated by STAs using FH PHYs. |
| 7 | DS Parameter Set | The DS Parameter Set information element is present within Probe Response frames generated by STAs using Clause 15, Clause 18, and Clause 19 PHYs. |
| 8 | CF Parameter Set | The CF Parameter Set information element is present only within Probe Response frames generated by APs supporting a PCF. |
| 9 | IBSS Parameter Set | The IBSS Parameter Set information element is present only within Probe Response frames generated by STAs in an IBSS. |

FIG. 7

| Element ID | Length | DSE Registered Location element body field |
|---|---|---|

Octets :       1              1                           20

| Category | Action Value | RequesterSTA Address | ResponderSTA Address | Reason Result Code | Enablement Identifier |
|---|---|---|---|---|---|
| Octets: 1 | 1 | 6 | 6 | 1 | 2 |

FIG. 11

| Element ID | Length | Band Indication |
|---|---|---|
| 1 | 1 | 1 |

FIG. 12

| Element ID | Length (2*n) | Operating Class 1 | Channel Number 1 | ... | Operating Class n | Channel Number n |
|---|---|---|---|---|---|---|
| 1 | 1 | 1 | 1 | | 1 | 1 |

Octets:

| Order | Information |
|---|---|
| 1 | SSID |
| 2 | Supported rates |
| 3 | Request information |
| 4 | Extended Supported Rates |
| 5 | Supported Operating Classes |
| Last | Vendor Specific |

FIG. 15

| Element ID | Length | Current Operating Class | List of Operating Class(es) |
|---|---|---|---|

Octets:   1   1   1   Length-1

FIG. 16

| Element ID | Length | Operating Class | Channel Number |
|---|---|---|---|

Octets:   1   1   1   1

METHOD AND APPARATUS FOR RECEIVING MULTI-BAND INFORMATION IN A WLAN SYSTEM

This is a U.S. National Phase Entry of PCT Application No. PCT/KR2011/001883, filed Mar. 18, 2011, and claims the benefit of US Provisional Application Nos. 61/315,391 filed Mar. 18, 2010; 61/315,397 filed Mar. 19, 2010; 61/321,508 filed Apr. 7, 2010; 61/330,903 filed May 4, 2010; and 61/433,508 filed Jan. 17, 2011.

TECHNICAL FIELD

The present invention relates to a wireless LAN system and more particularly to a method and apparatus for receiving multi-band information in a wireless LAN system.

BACKGROUND ART

A standard of a wireless local area network (WLAN) technology is being developed as a standard of Institute of Electrical and Electronics Engineers (IEEE) 802.11. IEEE 802.11a and IEEE 802.11b use an unlicensed band in 2.4 GHz or 5 GHz and IEEE 802.11b provides a transfer rate of 11 Mbps and IEEE 802.11a provides a transfer rate of 54 Mbps. IEEE 802.11g applies Orthogonal Frequency Division Multiplexing (OFDM) in 2.4 GHz to provide a transfer rate of 54 Mbps. IEEE 802.11n applies multiple input multiple output-OFDM (MIMO-OFDM) to provide a transfer rate of 300 Mbps for 4 spatial streams. IEEE 802.11n supports a channel bandwidth of up to 40 MHz. In this case, IEEE 802.11n provides a transfer rate of 600 Mbps.

An IEEE 802.11af standard for defining operation of an unlicensed device in a TV whitespace (TVWS) band is currently being developed.

The TVWS band, which is a frequency band allocated to a broadcast TV, includes an Ultra High Frequency (UHF) band and a Very High Frequency (VHF) band. Specifically, the TVWS band is a frequency band which is allowed to be used by an unlicensed device under a condition that this does not hinder communication of a licensed device that operates in the frequency band. The licensed device may include a TV or a wireless microphone. The licensed device may be referred to as an incumbent user or a primary user. To overcome the problem of coexistence between unlicensed devices, a signaling protocol such as a common beacon frame, a frequency mechanism, or the like may be required for the unlicensed devices.

Operations of all unlicensed devices are permitted in a band of 512-608 MHz and a band of 614-698 MHz. However, only communication between fixed devices is permitted in bands of 54-60 MHz, 76-88 MHz, 174-216 MHz, and 470-512 MHz. The term "fixed device" refers to a device that performs signal transmission only at a fixed location. An IEEE 802.11 TVWS terminal is an unlicensed device that operates, in the TVWS spectrum, using an IEEE 802.11 media access control (MAC) layer and a physical (PHY) layer.

An unlicensed device that desires to use the TVWS band should provide a function to protect licensed devices. Accordingly, the unlicensed device should check whether or not a licensed device is occupying the band before the unlicensed device starts signal transmission.

To accomplish this, the unlicensed device may check whether or not the band is being used by a licensed device by performing spectrum sensing. Examples of the spectrum sensing mechanism include an energy detection scheme and a feature detection scheme. The unlicensed device may determine that a licensed device is using a specific band when the intensity of a received signal is greater than a specific level or when a DTV preamble is detected. Upon determining that a licensed device is operating in a channel that is immediately adjacent to a channel currently used by the unlicensed device, the unlicensed device should reduce transmission power.

In the spectrum sensing mechanism, power consumption of a station (STA) is relatively high since the sensing duration is a relatively great period of above 10 ms. Particularly, the sensing duration is proportional to the possibility of detection of a licensed device signal and therefore the possibility of detection of a licensed device signal increases as the sensing duration increases.

A station (STA) which can support a plurality of bands (for example, 2.4 GHz, 5 GHz, and the TVWS band) may be present. An STA that can support multi-band is referred to as a multi-band STA. In order to shift to a different band while operating in one band, the multi-band STA should perform scanning after shifting to a channel of the different band.

DISCLOSURE

Technical Problem

In some case, a multi-band STA may shift to a different band while operating in one band as described above.

It is an object of the present invention to provide a method for receiving multi-band information, which allows a station that supports multi-band to efficiently shift to a different band while operating in one band.

Objects of the present invention are not limited to those described above and other objects will be clearly understood by a person having ordinary knowledge in the art from the following description.

Technical Solution

To achieve the above objects, an aspect of the present invention provides a method for receiving multi-band information by a first station (STA) that operates as an unlicensed device that is allowed to operate in an available channel that is not being used by a licensed device in a whitespace band in a wireless LAN system, wherein the first station receives, from a second station, information regarding a second band different from a first band through the first band through which the first station and the second station are currently performing communication, and performs communication with the second station through the second band, and the first station and the second station support the first band and the second band.

Here, the first station may receive an enabling signal for the second band including a band indication field through the first band and receive a frame including information regarding a channel of the second band through the first band and the band indication field may indicate which band the enabling signal is for.

The band indication field may be in a bitmap form.

The frame may include an operating class field and a channel number field and the operating class field and the channel number field may indicate, in combination, a channel in which the second station operates.

The first station may transmit a request message for requesting information regarding a band, which the first station desires to find, to the second station through the first band and receive a response message including information regarding the second band.

The request message may include a band indication field that indicates the band that the first station desires to find.

The request message may include an operating class field that indicates an operating class of the band that the first station desires to find.

The response message may include information regarding a Basic Service Set (BSS) that operates in the second band.

The response message may further include information regarding a channel of the BSS.

The request message may be a probe request frame and the response message may be a probe response frame.

To achieve the above objects, another aspect of the present invention provides a first station (STA) that operates as an unlicensed device that is allowed to operate in an available channel that is not being used by a licensed device in a whitespace band in a wireless LAN system, wherein the first station includes a reception module for receiving, from a second station, information regarding a second band different from a first band through the first band through which the first station and the second station are currently performing communication, and a processor for performing communication with the second station through the second band, and the first station and the second station support the first band and the second band.

Advantageous Effects

According to embodiments of the present invention, a station which is currently operating in a band can efficiently shift to a different band by receiving, without channel shift, information regarding the different band through the band in which the station is currently operating.

DESCRIPTION OF DRAWINGS

FIG. 4 illustrates information elements included in a probe response frame.

FIG. 7 illustrates a format of a DSE Registered Location element.

FIG. 11 illustrates an enabling signal information element according to the first embodiment of the present invention.

FIG. 12 illustrates a multi-band operation element according to the first embodiment of the present invention.

FIG. 15 illustrates a supported operating classes information element.

FIG. 16 illustrates a multi-band channel information element according to the second embodiment of the present invention.

BEST MODE

Reference will now be made in detail to the preferred embodiments of the present invention with reference to the accompanying drawings. The detailed description, which will be given below with reference to the accompanying drawings, is intended to explain exemplary embodiments of the present invention, rather than to show the only embodiments that can be implemented according to the invention. The following detailed description includes specific details in order to provide a thorough understanding of the present invention. However, it will be apparent to those skilled in the art that the present invention may be practiced without such specific details.

In some instances, known structures and devices are omitted or shown in block diagram form, focusing on important features of the structures and devices, so as not to obscure the concept of the present invention. The same reference numbers will be used throughout this specification to refer to the same or like parts.

First, a general configuration of a wireless LAN system is described below with reference to FIGS. 1 and 2.

Figure 1:
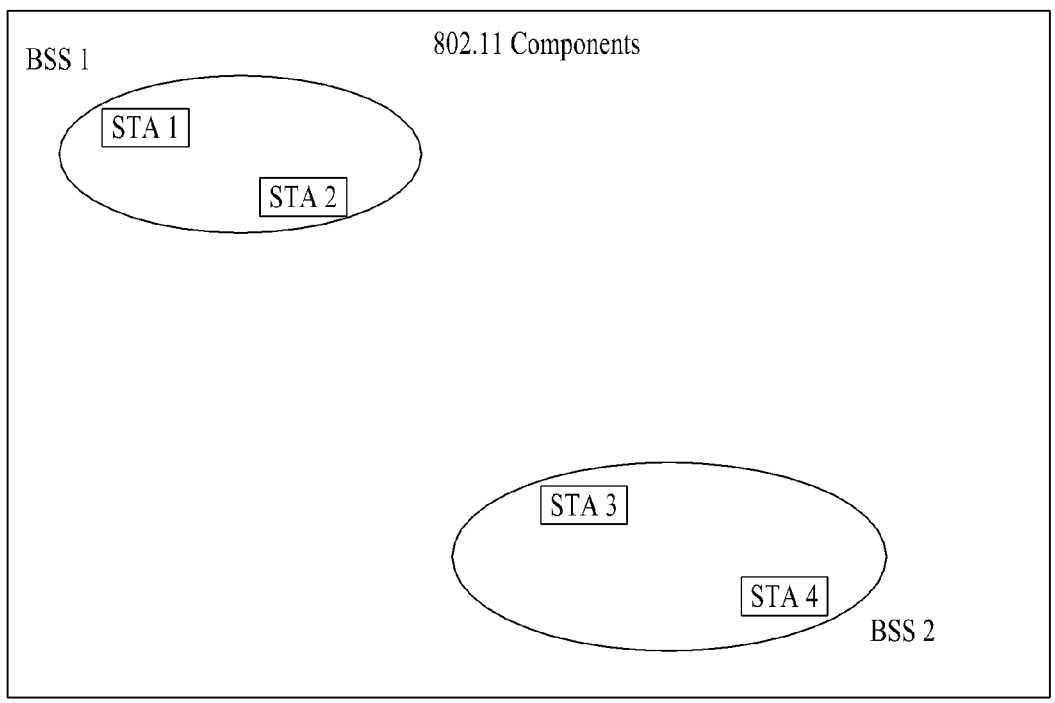
FIG. 1 illustrates an exemplary configuration of a wireless LAN system.

FIG. 1 illustrates an exemplary configuration of a wireless LAN system.

As shown in FIG. 1, the wireless LAN system includes one or more Basic Service Sets (BSSs). A BSS is a set of Stations (STAs) which can communicate with each other after successfully achieving synchronization.

The STA is a logical entity that includes an interface for a physical layer of a wireless medium and a Medium Access Control (MAC) layer. STAs include access point (AP) and non-AP stations. Among STAs, a mobile terminal that is operated by a user may be a non-AP STA. When the term "STA" is stated, it may refer to a non-AP STA. The non-AP STA may also be referred to as another term such as a terminal, a Wireless Transmit/Receive Unit (WTRU), a User Equipment (UE), a Mobile Station (MS), a mobile terminal, or a mobile subscriber unit.

The AP is an entity that provides an associated station (STA), which is coupled to the AP, with a connection to a Distribution System (DS) through a wireless medium. The AP may also be referred to as a concentrated controller, a Base Station (BS), a Node-B, a Base Transceiver System (BTS), or a site controller.

The BSS may be classified into an infrastructure BSS and an independent BSS (IBSS).

Each BBS shown in FIG. 1 is an IBSS. The IBSS is a BSS that does not include an AP. Since the IBSS does not include an AP, the IBSS is not allowed to connect to a DS and thus forms a self-contained network.

Figure 2:
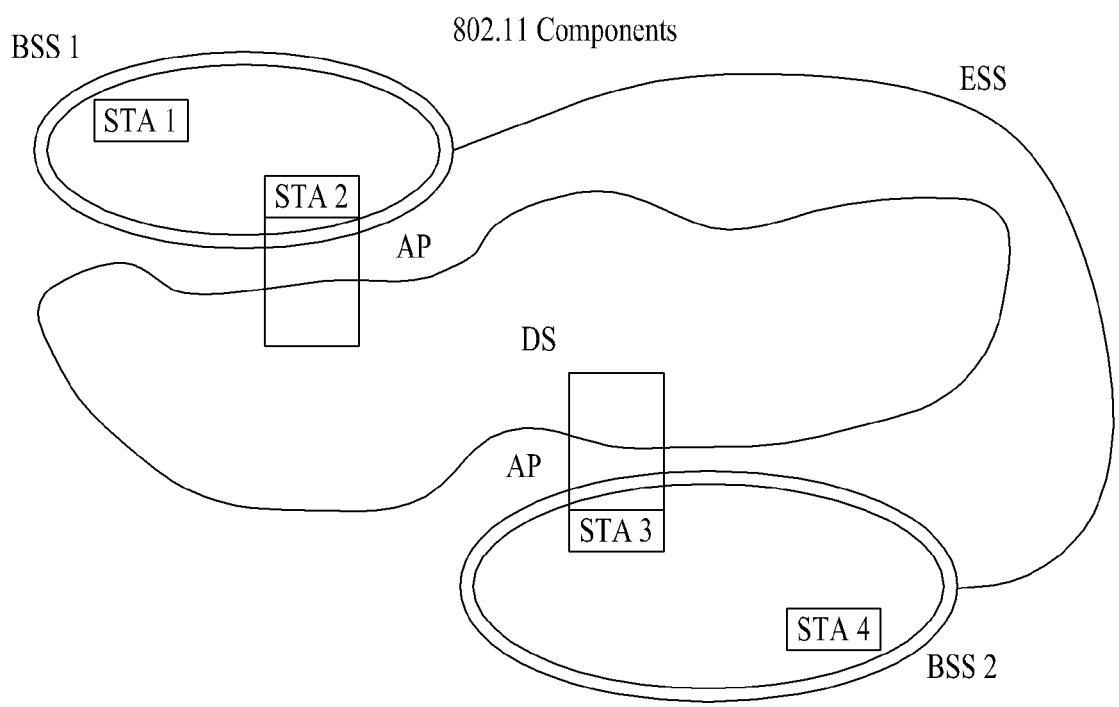
FIG. 2 illustrates another exemplary configuration of the wireless LAN system.

FIG. 2 illustrates another exemplary configuration of the wireless LAN system.

Each BSS shown in FIG. 2 is an infrastructure BSS. The infrastructure BSS includes one or more STAs and an AP. In the infrastructure BSS, in principle, communication between non-AP STAs is performed via an AP. However, when a direct link has been established between non-AP STAs, direction communication can be performed between the non-AP STAs.

As shown in FIG. 2, a plurality of infrastructure BSSs can be connected to each other through a DS. A plurality of BSSs connected through a DS is referred to as an Extended Service Set (ESS). STAs included in the ESs can communicate with each other. In the same ESS, a non-AP STA can move from one BSS to another BSS while performing communication seamlessly.

The DS is a mechanism which connects a plurality of APs. The DS is not necessarily a network and there is no limitation to the form of the DS provided that the DS can provide a specific distribution service. For example, the DS may be a wireless network such as a mesh network and may also be a physical structure that connects APs to each other.

A spectrum which is not used by a licensed device is referred to as a whitespace, which can be used by an unlicensed device. To allow an STA to operate in the whitespace spectrum, first, there is a need to provide a protection scheme for licensed devices (or incumbent users). A channel, which can be used by an unlicensed device since the channel is not used by any licensed device, is referred to as an available channel. The most basic methods for an STA or AP to determine availability of a TV channel include a spectrum sensing method and a method of connecting to a database (DB) to acquire a TV channel. Information of the DB includes information regarding, for example, a schedule for use of a specific channel by a licensed device at a specific location. Accordingly, when a STA or AP desires to determine availability of a TV channel, the STA or AP needs to connect to the DB through the Internet to acquire DB information based on location information of the STA or AP.

To connect to a network, the STA needs to search for any network in which the STA can participate. The STA needs to identify a compatible wireless network before participating in the network. A procedure for identifying a network present in a specific region is referred to as scanning.

Such scanning is classified into active scanning and passive scanning.

Figure 3:
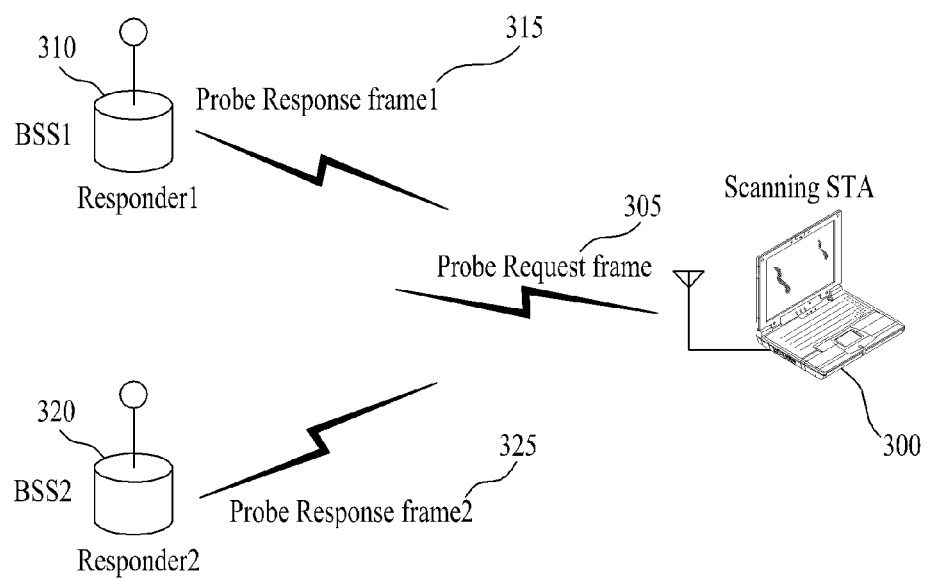
FIG. 3 schematically illustrates active scanning.

FIG. 3 schematically illustrates active scanning.

When an STA performs scanning using the active scanning scheme, the STA transmits a probe request frame in order to search for any AP around the STA while switching between channels and then awaits a response to the probe request frame. The responder transmits a probe response frame to the STA in response to the probe request frame transmitted from the STA. Here, the responder is an STA which has last transmitted a beacon frame in a BSS of a channel which is being scanned. In the infrastructure BSS, an AP serves as the responder since the AP transmits a beacon frame and, in the IBSS, the responder is not fixed since STAs in the IBSS take turns transmitting a beacon frame.

Referring to FIG. 3, when a scanning STA 300 transmits a probe request frame 305, responder 1 (310) of BSS1 and responder 2 (320) of BSS2, which have received the probe request frame, transmit probe response frame 1 (315) and probe response frame 2 (325) to the scanning STA 300. Upon receiving the probe response frame, the scanning STA 300 stores BSS related information included in the received probe response frame and shifts to a next channel and performs scanning of the next channel using the same method.

FIG. 4 illustrates information elements included in a probe response frame. As shown in FIG. 4, the probe response frame may include a timestamp, a beacon interval, capability, an SSID element, a supported rates element, or the like. The beacon interval represents an interval between beacon transmission times. The SSID element includes an ID of an ESS or IBSS.

Figure 5:
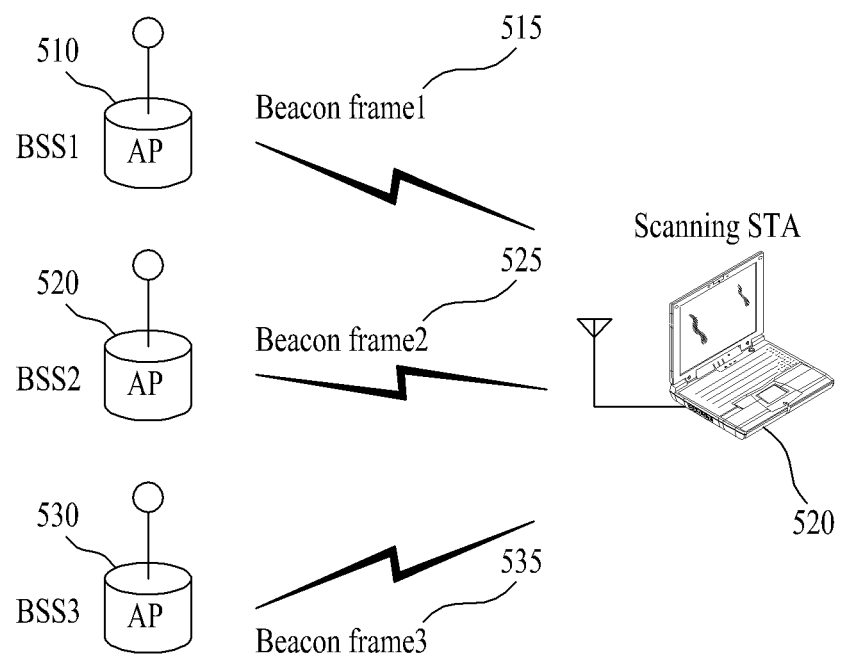
FIG. 5 schematically illustrates passive scanning.

FIG. 5 schematically illustrates passive scanning.

When an STA performs scanning using the passive scanning scheme, the STA awaits a beacon frame while switching between channels. The beacon frame, which is one of the management frames in IEEE 802.11, indicates presence of a wireless network and is transmitted at regular intervals to allow an STA which performs scanning to locate a wireless network to participate in the wireless network. In the infrastructure BBS, the AP serves to transmit the beacon frame at regular intervals.

When the STA that performs scanning has received a beacon frame, the STA stores BSS related information in the beacon frame and records beacon frame information in each channel while switching between channels.

In the example of FIG. 5, when a scanning STA 500, which is performing scanning using the passive scanning scheme, has received beacon frame 1 (515) transmitted by AP1 (510) of BSS1 and beacon frame 2 (525) transmitted by AP2 of BSS2 and has not received beacon frame 3 (535) transmitted by AP3 (530) of BSS3, the scanning STA 500 stores information indicating that the two BSSs (BSS1 and BSS2) have been found in the measurement channel and shifts to another channel.

Compared to passive scanning, active scanning has an advantage in that delay and power consumption are low.

The following is a description of a procedure in which an STA is enabled (or activated) in order to operate in a TW White Space (TVWS) band. Although embodiments of the present invention are described with reference to a TVWS band as an example, the present invention is not limited to the TVWS band and may also be applied to any case in which an STA operates in a whitespace band. The whitespace band is a band which can be used by an unlicensed device while it is not being used by a licensed device.

An unlicensed device which operates in a TVWS band may be classified into an enabling STA and a dependent STA. The enabling STA is an STA which can enable the dependent STA. Even when the enabling STA has not received an enabling signal, the enabling STA can transmit a signal and can initiate the network.

The enabling STA may provide geo-location information to a database (DB) and acquire a list of channels available at a corresponding geo-location from the DB. The enabling STA is not necessarily a WLAN STA and may be a logical entity or a network server that can provide enabling-related services.

The dependent STA is an STA which can transmit a signal only when the dependent STA has received an enabling signal. The dependent STA is controlled by the enabling STA. The dependent STA should be enabled through the enabling STA and cannot be enabled independently.

Figure 6:
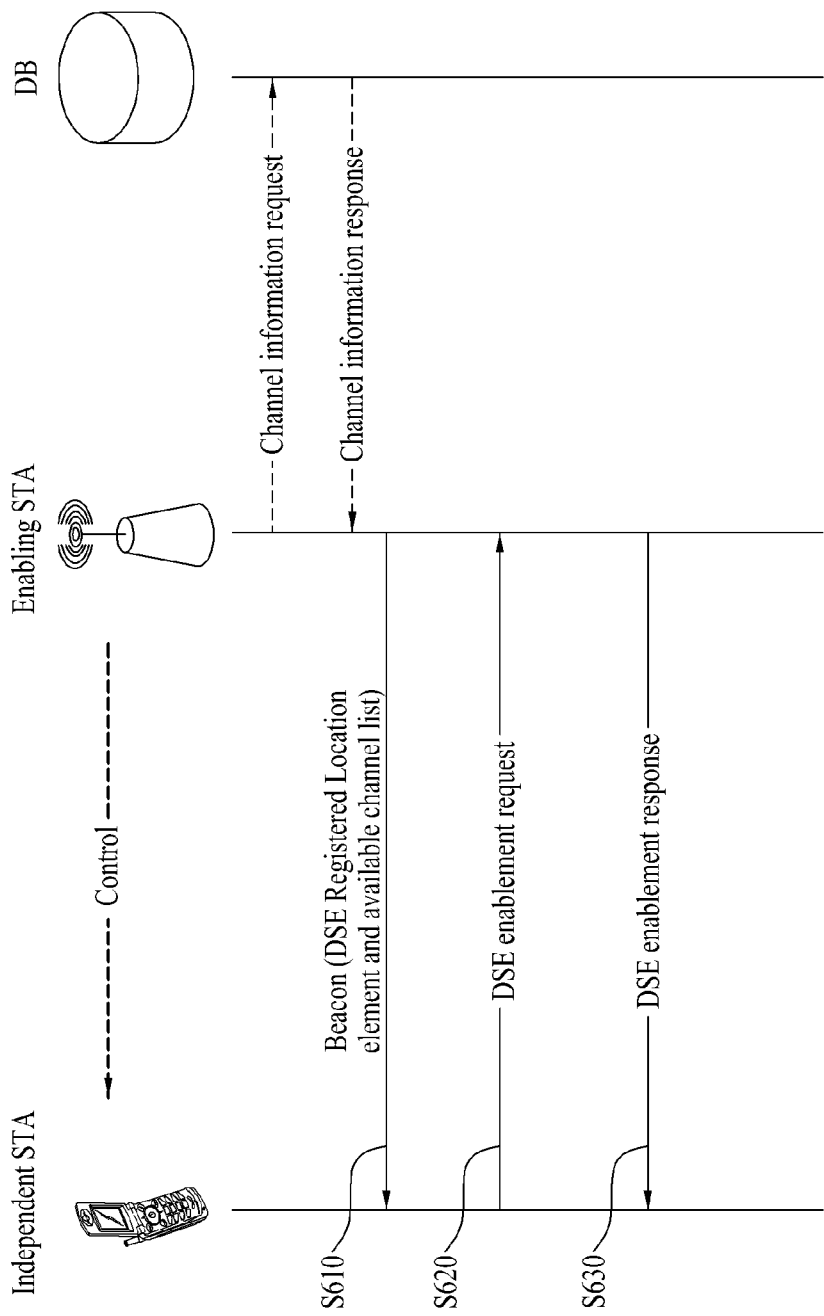
FIG. 6 illustrates an STA enabling procedure.

FIG. 6 illustrates an STA enabling procedure.

IEEE 802.11y is a standard designed for operation of unlicensed devices in a band of 3.5 GHz. The standard describes an enabling procedure which is referred to as Dynamic STA Enablement (DSE). The procedure in which a dependent STA is enabled by an enabling STA may be performed in a manner similar to the DSE procedure of IEEE 802.11y. Actually, an enabling procedure applied to whitespace may not necessarily be the same as the DSE procedure. However, basically, the dependent STA can transmit a signal through the corresponding band/channel only after the dependent STA has received an enabling signal.

As shown in FIG. 6, the enabling STA transmits a probe response frame or a beacon including an enabling signal (S610). The enabling signal is a signal indicating that enabling is possible. In the example of the enabling procedure shown in FIG. 6, a beacon or a probe response frame including a DSE registered location element serves as an enabling signal.

Figure 8:
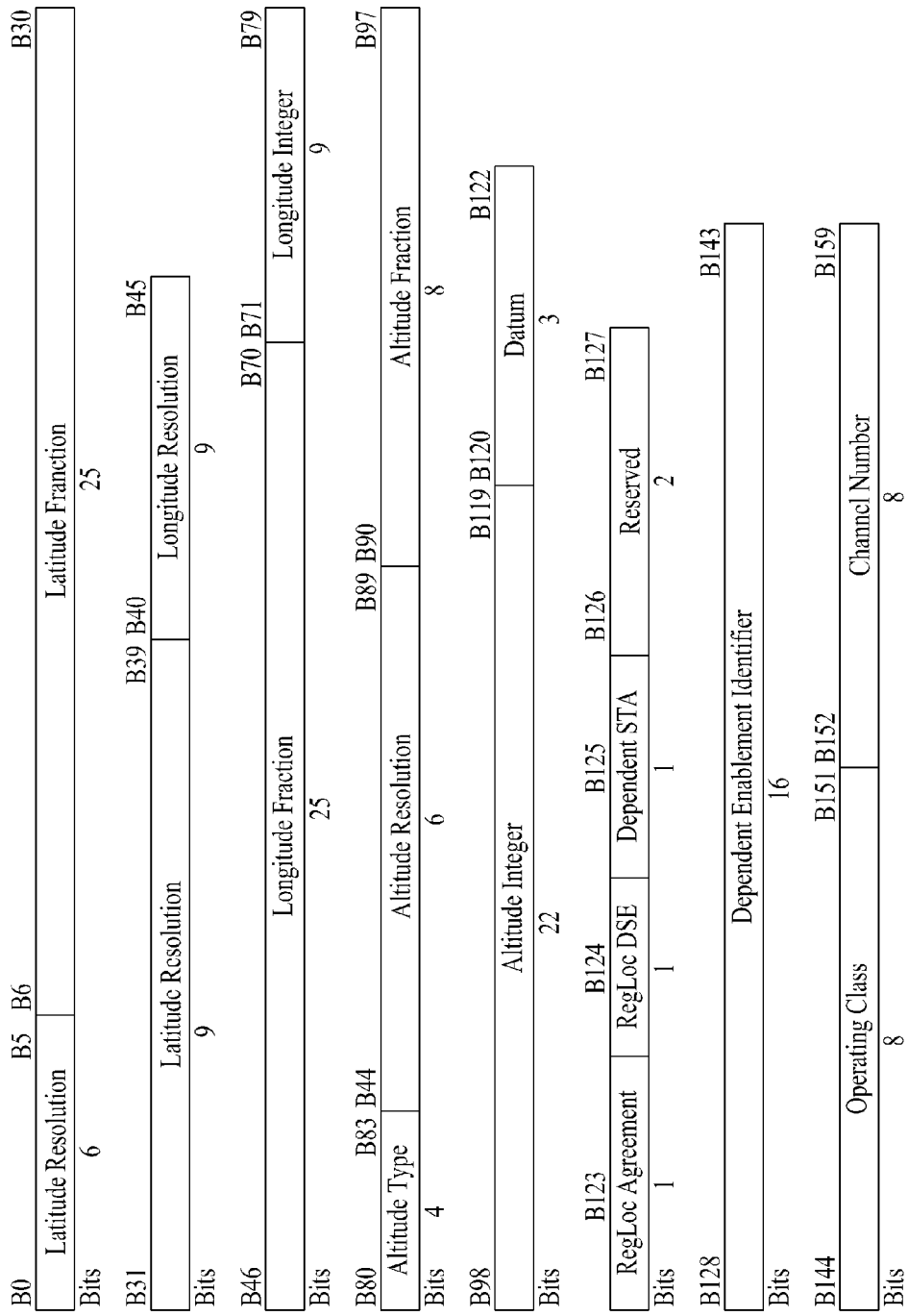
FIG. 8 illustrates a DSE Registered Location element body field.

FIG. 7 illustrates a format of a DSE Registered Location element and FIG. 8 illustrates a DSE Registered Location element body field.

As shown in FIG. 7, the DSE Registered Location element includes an element ID, a length field, and a DSE Registered Location element body field. The element ID field is an ID indicating that the corresponding element is a DSE Registered Location element and the length field indicates the length of the corresponding element.

As shown in FIG. 8, the DSE Registered Location element body field of the DSE Registered Location element includes a regLoc DSE bit which is set to 1. An operating class field and a channel number field included in the DSE Registered Location element body field indicate a channel through which a dependent STA can transmit an enabling request.

The dependent STA, which has received and decoded the DSE Registered Location element, transmits a DSE enablement request frame to the enabling STA using the channel indicated by the DSE Registered Location element (S320) and receives a DSE enablement response frame from the enabling STA (S330).

Figures 9, 10:
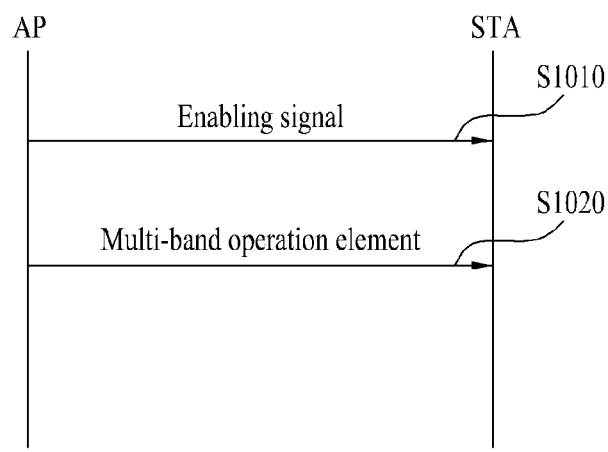
FIG. 9 illustrates a format of a DSE enablement frame.
FIG. 10 illustrates a method for receiving multi-band information according to a first embodiment of the present invention.

FIG. 9 illustrates a format of a DSE enablement frame. The DSE enablement frame may be a DSE enablement request frame or a DSE enablement response frame.

As shown in FIG. 9, the DSE enablement frame includes a category field, an action value field, a requester STA address field, a responder STA address field, a reason result code field, and an enablement identifier field.

The requester STA address field indicates a MAC address of a STA that transmits a DSE enablement frame and the responder STA address field indicates a MAC address of the STA that will receive a DSE enablement frame. The reason result code field indicates whether the DSE enablement frame is a DSE enablement request frame or a DSE enablement response frame. The enablement identifier field indicates an enablement ID which the enabling STA allocates to the dependent STA when the DSE enablement frame is a DSE enablement response frame.

Accordingly, the requester STA address field of the DSE enablement request frame transmitted by the dependent STA indicates a MAC address of the dependent STA, the responder STA address field indicates a MAC address of the enabling STA, and the reason result code field indicates that the DSE enablement frame is a DSE enablement request frame. The enablement identifier field is filled with an invalid value.

In addition, the requester STA address field of the DSE enablement response frame transmitted by the enabling STA indicates a MAC address of the enabling STA, the responder STA address field indicates a MAC address of the dependent STA, and the reason result code field indicates that the DSE enablement frame is a DSE enablement response frame. In addition, the enablement identifier field is filled with an enablement ID which the enabling STA has allocated to the dependent STA.

The following is a description of a method for receiving multi-band information according to an embodiment of the present invention.

In order to shift to and operate in a different band while operating in one band, an STA that supports multi-band requires information regarding the different band. According to an embodiment of the present invention, the multi-band STA receives information regarding the different band from the AP using the currently-operating band. In other words, the multi-band STA receives information regarding the second band which is different from the first band through the first band through which the multi-band STA and the AP are currently performing communication with each other. For example, an STA which is operating in a band of 2.4 GHz may receive BSS information or information regarding a TVWS channel from the AP through a channel of the 2.4 GHz band.

First, a method for receiving multi-band information according to a first embodiment of the present invention is described below with reference to the drawings. FIG. 10 illustrates a method for receiving multi-band information according to the first embodiment of the present invention.

As shown in FIG. 10, an STA receives an enabling signal regarding a second band, which is different from a first band, using the first band in which the STA is currently operating (S1010).

FIG. 11 illustrates an enabling signal information element according to the first embodiment of the present invention. The enabling signal information element may be transmitted within a beacon frame or a probe response frame. As shown in FIG. 11, the enabling signal information element according to the first embodiment of the present invention includes a band indication field. The band indication field indicates a band that an AP, which transmits the enabling signal information element, supports. Here, it can be seen that an STA which has received the enabling signal information element can shift to and operate in the band indicated by the band indication field. That is, the band indication field indicates a band for which the enabling signal information element is an enabling signal.

The band indication field can be set to a value indicating a band that the AP supports. Table 1 illustrates exemplary values of the band indication field.

TABLE 1

| Band Indication | Value of Band Indication |
| --- | --- |
| 0 | TV Band |
| 1 | Radar |
| 2 | Cellular band |
| 3-255 | Reserved |

In the case of Table 1, when the value of the band indication field is set to 0, this indicates that the AP supports a TV band and the STA can shift to and operate in the TV band.

The band indication field may be expressed in a bitmap form. Since the band indication field is 1 octet, the field includes 8 bits, each of which may represent one band. Accordingly, the band indication field may indicate whether or not the AP supports up to 8 bands. A bit corresponding to a specific band may be set to 1 when the AP supports the specific band and may be set to 0 when the AP does not support the specific band.

Referring back to FIG. 10, the STA receives, from the AP, a multi-band operation element including information regarding a channel of the second band which is different from the first band in which the STA is currently operating (S1020).

FIG. 12 illustrates a multi-band operation element according to the first embodiment of the present invention. The multi-band operation element indicates channels through which the AP operates in multiple bands. The AP which supports multi-band can simultaneously operate in a plurality of operating classes. Accordingly, the AP transmits a list of operating classes and channels in which the AP operates. Then, when the STA that supports multi-band has received a multi-band operation element including the list of operating classes and channels in which the AP operates, the STA can acquire information regarding the band different from the band in which the STA is currently operating.

The AP may transmit the multi-band operation element within a beacon frame. Alternatively, when the AP receives a probe request frame that requests channel information of the different band from the STA, the AP transmits a probe response frame including the multi-band operation element to the STA.

As shown in FIG. 12, the multi-band operation element includes an element ID field, a length field, an operating class field, and a channel number field.

The element ID field indicates that the element is a multi-band operation element and the length field indicates the length of fields that follow the length field. Since the operating class field is 1 octet and the channel number field is 1 octet, the value of the length field is equal to the product of 2 and the number (n) of pairs of the operating class field and the channel number field (i.e., n×2).

The operating class field indicates the operating class of a channel in which the AP operates and the channel number field indicates the channel number of the channel in which the AP operates. Accordingly, a pair of one operating class field and one channel number field indicates one channel in which the AP operates. As shown in FIG. 12, the multi-band operation element may include a plurality of pairs of an operating class field and a channel number field.

Thereafter, the STA can operate in a band indicated by the band indication field of the enabling signal information element received in step S1010. Here, the STA can operate in a channel indicated by a pair of an operating class field and a channel number field of the multi-band operation element.

For example, when an STA has received an enabling signal information element including a band indication field indicating a TVWS band while the STA is operating in a band other than the TVWS band, the STA may transmit a DSE enablement request frame to the AP through a channel indicated by a pair of an operating class field and a channel number field of the multi-band operation element. Then, when the STA is enabled by receiving a DSE enablement response frame from the AP, the STA can perform communication with the AP in the TVWS band.

Next, a method for receiving multi-band information according to a second embodiment of the present invention is described below with reference to the drawings.

In the second embodiment of the present invention, while an STA is operating in a first band, the STA transmits a probe request frame to an AP in order to request information regarding a second band from the AP and receives a probe response frame including BSS information of the second band from the AP. Although the second embodiment of the present invention is described with reference to a probe request frame and a probe response frame as an example, the present invention is not limited to the probe request frame and the probe response frame and also includes the case in which a request message and a response message are used.

For example, let us assume that an STA and an AP, which simultaneously support a 2.4 GHz band and TVWS, are present. The STA finds the AP by performing scanning in a 2.4 GHz ISM band and then establishes an association with the AP. In order to acquire TVWS BSS information of the AP, the STA transmits a probe request frame to the AP in the currently connected 2.4 GHz ISM band. Here, the probe request frame includes information regarding a band that the STA desires to find (or locate). The information regarding the band that the STA desires to find may be a band indication or an operating class.

When the AP has received the probe request frame, the AP transmits a probe response frame including information of a BSS, which operates in the band requested by the STA, to the STA. The BSS information may include a timestamp, a beacon interval, capability, an SSID, a supported rate, a channel number, a power constraint, or the like. When the AP does not support the band requested by the STA, the AP transmits no probe response frame.

The present invention is characterized in that the channel that the STA desires to find is different from the channel through which the probe request frame is transmitted. That is, the STA may request scanning of an operating class of a band different from a band currently used by the STA. Here, the STA may issue a request to find a plurality of bands or operating classes.

Figures 13, 14:
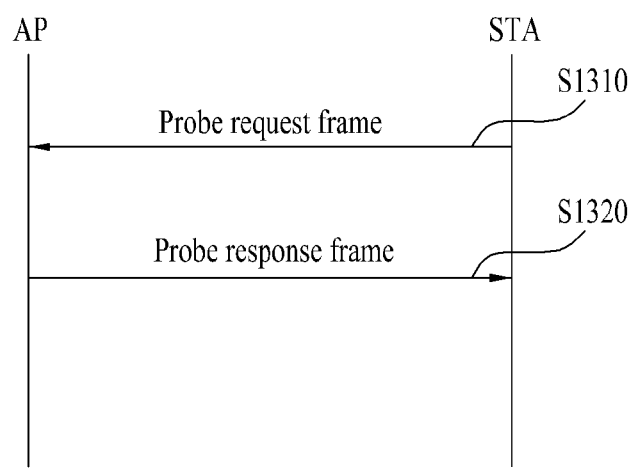
FIG. 13 illustrates a method for receiving multi-band information according to a second embodiment of the present invention.
FIG. 14 illustrates an exemplary probe request frame according to the second embodiment of the present invention.

FIG. 13 illustrates a method for receiving multi-band information according to the second embodiment of the present invention.

As shown in FIG. 13, an STA transmits a request message requesting information regarding a band that the STA desires to find to an AP through a first band through which the STA is currently performing communication with the AP (S1310). Here, the request message may be a probe request frame and the request message may include a band indication field which indicates the band that the STA desires to find and an operating class field which indicates an operating class of the band that the STA desires to find.

FIG. 14 illustrates an exemplary probe request frame according to the second embodiment of the present invention. Specifically, FIG. 14 illustrates the case in which a probe request frame includes an operating class of a band that the STA desires to find.

The probe request frame includes a destination address field which may be set to a broadcast address or a MAC address of the AP to which the STA is currently connected.

As shown in FIG. 14, the probe request frame includes a supported operating classes information element. The supported operating classes information element indicates an operating class that the STA desires to find.

FIG. 15 illustrates a supported operating classes information element. As shown in FIG. 15, the supported operating classes information element includes a currently operating class field and a List of Operating Classes field.

The current operating class field indicates an operating class in which the STA is currently operating and the List of Operating Classes field indicates operating classes that the STA desires to find. The STA may request information regarding a plurality of operating classes from the AP and the List of Operating Classes field indicates a plurality of operating classes that the STA desires to find.

Alternatively, the probe request frame may include an operating class information element indicating one operating class that the STA desires to find. The probe request frame may include one or more operating class information elements. When the probe request frame includes a plurality of operating class information elements, it is possible to support scanning of a plurality of operating classes. For example, when the STA transmits an operating class information element indicating 5 GHz and an operating class information element indicating TVWS to the AP in 2.4 GHz, the STA can acquire both information regarding a BBS which operates in 5 GHz and information regarding a BSS that operates in TVWS.

Referring to FIG. 13, the STA receives a response message from the AP in response to the request message transmitted in step S1310 (S1320). Here, the response message may be a probe response frame and may include information regarding a BSS that operates in an operating class or band that the STA desires to find.

The probe response frame may include a multi-band channel information element including information regarding a channel of a BSS in which the probe response frame is included.

FIG. 16 illustrates a multi-band channel information element according to the second embodiment of the present invention. As shown in FIG. 16, the multi-band channel information element includes an operating class field and a channel number field. The operating class field and the channel number field indicate, in combination, a channel of a BSS in which the probe response frame is included. When the number of channels of the BSS is more than 1, the multi-band channel information element may include a plurality of operating class fields and a plurality of channel number fields.

The probe response frame may include a Whitespace Map (WSM) regarding the band requested by the STA. The WSM is obtained by generating information regarding channels, which an unlicensed device can use in a TVWS band, in a map form based on channel information that an enabling STA has acquired from a DB. The WSM includes a list of channels available to an unlicensed device. The channels included in the available channel list are those that are not being used by signals which should be legally protected. The channels included in the available channel list can be used by an unlicensed device when the unlicensed device has connected to the DB.

When the AP does not operate in a band or operating class that the STA desires to find, the AP transmits no probe response frame.

Figure 17:
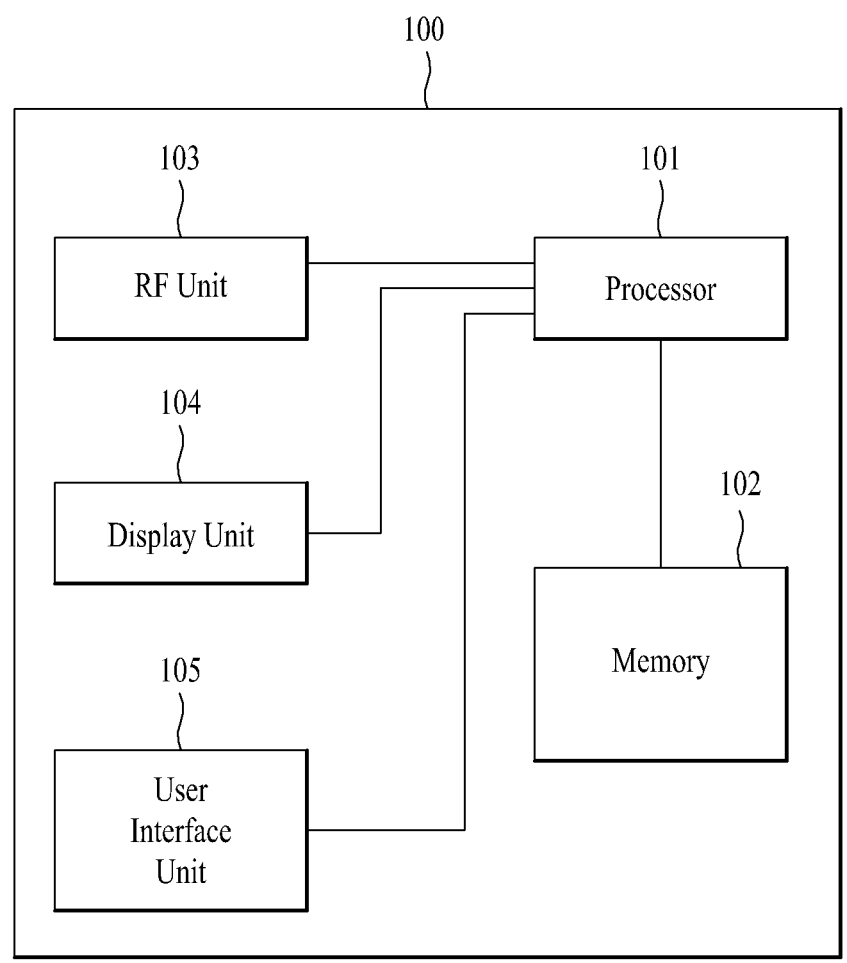
FIG. 17 is a block diagram illustrating a configuration of a device which can be applied to an STA or an AP and which can carry out the present invention.

FIG. 17 is a block diagram illustrating a configuration of a device which can be applied to an STA or an AP and which can carry out the present invention. As shown in FIG. 17, the device 100 includes a processor 101, a memory 102, a Radio Frequency (RF) unit 103, a display unit 104, and a user interface unit 105.

A physical interface protocol layer is implemented in the processor 101. The processor 101 provides a control plane and a user plane. Functions of each layer can be performed by the processor 101.

The memory 102 is electrically connected to the processor 101 and stores an operating system, applications, and general files.

When the device 600 is a user equipment, the display unit 104 may display various information and may be implemented using a known Liquid Crystal Display (LCD), a known Organic Light Emitting Diode (OLED), or the like. The user interface unit 105 may be coupled to a known user interface such as a keypad or a touchscreen.

The RF unit 103 is electrically connected to the processor 101 and transmits or receives a wireless signal. The RF unit 103 may include a transmission module and a reception module.

The transmission module may perform specific coding and modulation on a signal and/or data, which is scheduled to be transmitted to the outside by the processor 101, and then may deliver the signal and/or data to an antenna.

The reception module may perform decoding and demodulation on a wireless signal, which is received from the outside through an antenna, to reconstruct the wireless signal into original data and then may deliver the reconstructed data to the processor 101.

The reception module according to an embodiment of the present invention receives information regarding a second band different from a first band from the AP through the first band through which the device 100 is currently performing communication with the AP.

The detailed description of the preferred embodiments of the present invention has been given to enable those skilled in the art to implement and practice the invention. Although the invention has been described with reference to the preferred embodiments, those skilled in the art will appreciate that various modifications and variations can be made in the present invention without departing from the spirit or scope of the invention described in the appended claims. Accordingly, the invention should not be limited to the specific embodiments described herein, but should be accorded the broadest scope consistent with the principles and novel features disclosed herein.

Although the various embodiments of the present invention have been described above mainly with reference to an IEEE 802.11 system, the present invention may be applied in the same manner to various mobile communication systems in which an unlicensed device can operate by acquiring available channel information.

The invention claimed is:

1. A method for receiving available channel information by a first station (STA) that operates as an unlicensed device that is allowed to operate in an available channel that is not being used by a licensed device in a whitespace band in a wireless LAN system, the method comprising:
   receiving a frame including an operating class field, a channel number field, and a maximum transmit power field from a second station; and
   operating in a channel indicated by the operating class field and the channel number field,
   wherein the operating class field and the channel number field indicate an available channel that can be used by an unlicensed device,
   wherein the maximum transmit power field indicates a maximum transmit power that is allowed in the available channel,
   wherein the first STA further receives an information element including a bit indicating that the frame includes available channel information from the second station, and
   wherein the information element is an extended capabilities information element.

2. The method according to claim 1, wherein the channel indicated by the operating class field and the channel number field is a wireless LAN channel.

3. The method according to claim 1, wherein the frame includes a plurality of sets, each including the operating class field, the channel number field, and the maximum transmit power field.

4. The method according to claim 3, wherein the frame includes a length field indicating information regarding a length of the frame and the number of the sets included in the frame is determined according to a value of the length field.

5. The method according to claim 1, further comprising scanning the channel indicated by the operating class field and the channel number field.

6. The method according to claim 1, wherein the second station is an enabling station.

7. The method according to claim 1, wherein the second station is an Access Point (AP).

8. A first station (STA) that operates as an unlicensed device that is allowed to operate in an available channel that is not being used by a licensed device in a whitespace band in a wireless LAN system, the first station comprising:
   a reception module configured to receive a frame including an operating class field, a channel number field, and a maximum transmit power field from a second station; and a processor configured to operate in a channel indicated by the operating class field and the channel number field, wherein the operating class field and the channel number field indicate an available channel that can be used by an unlicensed device, wherein the maximum transmit power field indicates a maximum transmit power that is allowed in the available channel, wherein the reception module receives an information element including a bit indicating that the frame includes available channel information from the second station, wherein the information element is an extended capabilities information element.

9. The first station according to claim 8, wherein the channel indicated by the operating class field and the channel number field is a wireless LAN channel.

10. The first station according to claim 8, wherein the frame includes a plurality of sets, each including the operating class field, the channel number field, and the maximum transmit power field.

11. The first station according to claim 10, wherein the frame includes a length field indicating information regarding a length of the frame and the number of the sets included in the frame is determined according to a value of the length field.

12. The first station according to claim 10, wherein the processor scans the channel indicated by the operating class field and the channel number field.

13. The first station according to claim 8, wherein the second station is an enabling station.

14. The first station according to claim 8, wherein the second station is an Access Point (AP).

* * * * *